(12) United States Patent
Weiss

(10) Patent No.: US 11,024,850 B2
(45) Date of Patent: Jun. 1, 2021

(54) LI-ION BATTERIES WITH IMPROVED ABUSE TOLERANCE AND PERFORMANCE

(71) Applicant: XILECTRIC, Fall River, MA (US)

(72) Inventor: Steven E. Weiss, Newton, MA (US)

(73) Assignee: XILECTRIC, INC., Fall River, MA (US)

( * ) Notice: Subject to any disclaimer, the term of this patent is extended or adjusted under 35 U.S.C. 154(b) by 0 days.

(21) Appl. No.: 16/140,967

(22) Filed: Sep. 25, 2018

(65) Prior Publication Data

US 2019/0097233 A1    Mar. 28, 2019

Related U.S. Application Data

(60) Provisional application No. 62/564,116, filed on Sep. 27, 2017.

(51) Int. Cl.
| | | |
|---|---|---|
| *H01M 4/62* | (2006.01) | |
| *H01M 4/36* | (2006.01) | |
| *H01M 10/0525* | (2010.01) | |
| *H01M 4/13* | (2010.01) | |
| *H01M 4/04* | (2006.01) | |
| *H01M 4/139* | (2010.01) | |
| *H01M 4/02* | (2006.01) | |
| *H01M 4/505* | (2010.01) | |

(52) U.S. Cl.
CPC ........... *H01M 4/62* (2013.01); *H01M 4/0409* (2013.01); *H01M 4/13* (2013.01); *H01M 4/139* (2013.01); *H01M 4/366* (2013.01); *H01M 10/0525* (2013.01); *H01M 4/364* (2013.01); *H01M 4/505* (2013.01); *H01M 2004/028* (2013.01)

(58) Field of Classification Search
CPC .... H01M 4/62; H01M 10/0525; H01M 4/366; H01M 2004/028; H01M 4/13; H01M 4/0409; H01M 4/139; H01M 4/505; H01M 4/364; Y02E 60/10
See application file for complete search history.

(56) References Cited

U.S. PATENT DOCUMENTS

| | | |
|---|---|---|
| 5,733,685 A | 5/1998 | Wang |
| 5,753,202 A | 5/1998 | Wang et al. |
| 7,749,660 B2 | 7/2010 | Lee et al. |
| 2002/0119375 A1* | 8/2002 | Zhang .................. H01M 4/485 429/232 |
| 2005/0274447 A1 | 12/2005 | Yadav et al. |
| 2006/0121352 A1 | 6/2006 | Kejha et al. |

(Continued)

OTHER PUBLICATIONS

ThermoFischer Scientific, EC-BU-918BT, MSDS Nov. 17, 2008, p. 1.

(Continued)

*Primary Examiner* — Kwang Han
(74) *Attorney, Agent, or Firm* — AKC Patents, LLC; Aliki K. Collins

(57) ABSTRACT

A lithium-ion battery includes a cathode comprising a lithium compound and the cathode further includes solid additives based on metal nitrides and/or borates. The solid additives improve the capacity retention of the lithium-ion battery and extend the battery lifetime. The solid additives also reduce the growth in internal resistance of the lithium-ion battery that is known to occur as Li-ion batteries age. The solid additives help stabilize the lithium-ion chemistry to high cell potentials or temperatures.

20 Claims, 12 Drawing Sheets

(56) References Cited

U.S. PATENT DOCUMENTS

| | | | |
|---|---|---|---|
| 2007/0065725 A1* | 3/2007 | Inoue | H01M 4/131 |
| | | | 429/232 |
| 2013/0277604 A1* | 10/2013 | Shimokita | H01M 4/362 |
| | | | 252/182.1 |
| 2014/0272594 A1 | 9/2014 | Safont Sempere et al. | |
| 2016/0365566 A1 | 12/2016 | Cui et al. | |
| 2017/0149051 A1* | 5/2017 | Fujita | H01M 4/131 |
| 2017/0225951 A1 | 8/2017 | Marsh et al. | |

OTHER PUBLICATIONS

PCT/US18/52765 ISR report.

Kajiyama, A., et al., "Principal Factors of Carbon Conductive Agents that Contribute to the Gas Formation in High-Voltage Cathode Systems." Journal of the Electrochemical Society 162(8) (2015) A1516-A1522.

Lux, S., et al., "The Mechanism of HF Formation in LiPF6 Based Organic Carbonate Electrolytes." Electrochemistry Communications 14 (2012) 47-50.

Zheng, J., et al., "Functioning Mechanism of AlF3 Coating on the Li- and Mn-Rich Cathode Materials." Chemistry of Materials 26 (2014) 6320-6327.

Zhang, S., "A review on electrolyte additives for lithium-ion batteries." Journal of Power Sources 162 (2006) 1379.

Wang, E., et al., "Stability of Lithium Ion Spinel Cells. III. Improved Life of Charged Cell." Journal of the Electrochemical Society 147(11) (2000) 4023-4028.

Metzger, M., et al., "Anodic Oxidation of Conductive Carbon and Ethylene Carbonate in High-Voltage Li-ion batteries Quantified by Online Electrochemical Mass Spectrometry." Journal of the Electrochemical Society 162(7) (2015) A1123-A1134.

Metzger, M., et al., "Carbon Coating Stability on High-Voltage Cathode Materials in H2O-Free and H2O-Containing Electrolyte." Journal of the Electrochemical Society 162(7) (2015) A1227-A1245.

Burns, J., et al., "Predicting and Extending the Lifetime of Li-ion Batteries." Journal of the Electrochemical Society 160(9) (2013) A1451-A1456.

Sun, Y., et al., "Surface structural change of ZnO-coated LiNi0.5Mn1.5O4 Spinel as 5V Cathode Materials at Elevated Temperatures." Electrochimica Acta 48 (2003) 503-506.

Tominaga, Y., et al., "Wet-jet milling-assisted exfoliation of h-BN particles with lamination structure." Ceramics International 41 (2015) 10512.

Lei, W., et al., "Porous boron nitride nanosheets for effective water cleaning." Nat. Commun. 4 2013 1.

Li, J., et al., "Activated boron nitride as an effective adsorbent for metal ions and organic pollutants." Sci. Rep. 3 2013 1.

Streletskii et al., "Mechanochemistry of Hexagonal Boron N, vol. 72itride. Reactivity upon interaction with water" Colloidal Journal 2010, No. 4. pp. 553-558.

* cited by examiner

Aged Electrolyte without additive

Aged Electrolyte with Boron Nitride-Based Additive

Fresh Electrolyte

LI-ION BATTERIES WITH IMPROVED ABUSE TOLERANCE AND PERFORMANCE

CROSS REFERENCE TO RELATED CO-PENDING APPLICATIONS

This application claims the benefit of U.S. provisional application Ser. No. 62/564,116 filed Sep. 27, 2017 and entitled "LI-ION BATTERIES WITH IMPROVED ABUSE TOLERANCE AND PERFORMANCE", the contents of which are expressly incorporated herein by reference.

FIELD OF THE INVENTION

The present invention relates to Li-ion batteries, and more particularly to Li-ion batteries with improved abuse tolerance and performance.

BACKGROUND OF THE INVENTION

Referring to FIG. 1A, a typical battery 80 includes a cathode electrode 82, an anode electrode 84, a separator 86, and an electrolyte 88. The anode is commonly referred to as the negative electrode and the cathode as the positive electrode. A Li-ion battery is a rechargeable battery in which lithium ions move from the negative electrode to the positive electrode during discharging and then back from the positive electrode to the negative electrode during charging. The cathode is usually made of a lithium oxide compound, while the anode is typically made of carbon/graphite. The electrolyte that allows the ionic movement of the lithium ions is usually an organic solvent with dissolved lithium salts. During the operation of the Li-ion battery a solid electrolyte interface (SEI) layer forms on the graphite surface of the anode material, due to side reactions of the anode surface with the electrolyte solvent and the dissolved salts. The presence of the SEI layer is considered important for the operation of the Li-ion battery. However, it is difficult to control the formation, growth, and stability of the SEI layer.

Li-ion batteries are used in rechargeable home electronic devices, such as cell phones, portable computing devices, electrical tools, medical devices and in car batteries for electric vehicles. Handheld electronics mostly use Li-ion batteries based on lithium cobalt oxide ($LiCoO_2$) (LCO), which has high energy density, but presents safety risks especially when damaged. Automotive batteries typically use lithium nickel manganese cobalt oxide ($LiNiMnCoO_2$) (NMC), or lithium nickel cobalt aluminum oxide ($LiNiCoAlO_2$) (NCA), based batteries. Other common cathode chemistries include lithium iron phosphate ($LiFePO_4$) (LFP), and substituted lithium ion manganese oxides ($LiMn_2O_4$) (LMO).

Large Li-ion factories are being built around the world to dramatically lower cost of storage technology through economies of scale. As the Li-ion technology matures, these manufacturers will find it increasingly difficult to further reduce costs. Improving cell longevity will become the most direct way to improve the economics of Li-ion technology moving forward.

Lithium ion batteries are sensitive to high temperatures and cell potentials. High cell potentials and elevated temperatures damage the Li-ion electrolyte decreasing the available storage capacity and shortening the useful cell lifetime. Capacity loss has been attributed to oxidation reactions at the cathode which create species that transport to and react at the anode damaging the solid electrolyte interface (SEI).

There is a need for Li-ion rechargeable batteries with improved abuse tolerance, performance, and battery lifetime.

SUMMARY OF THE INVENTION

The present invention relates to Li-ion batteries with improved abuse tolerance and performance.

In general, in one aspect, the invention features a lithium-ion battery including a cathode comprising a lithium compound and the cathode further includes solid additives based on metal nitrides and/or borates.

Implementations of this aspect of the invention may include one or more of the following features. The metal nitrides include one of boron nitride, silicon nitride, aluminum nitride, zirconium nitride, calcium nitride, or mixtures thereof. The borates include one of boric acid, lithium borate, sodium metaborate, sodium tetraborate, sodium borate, ammonium borate, lithium metaborate, metaboric acid, borate salts, borate polysalts, lithium tetraborate, or mixtures thereof. The solid additives are added in particulate form to a cathode ink comprising the lithium compound prior to casting the cathode. The solid additives are predispersed into carbon and form a composite carbon mixture and the composite carbon mixture is added to a cathode ink comprising the lithium compound of the cathode. The solid additives are milled. The solid additives comprise 0.5 to 2.0 weight percent of the cathode total solids. The solid additives are coated onto the cathode. The solid additives are produced by homogenizing a metal nitride in an aqueous solution of a borate. An aqueous solution of the solid additives has a pH in the range of 6 to 10.

In general, in another aspect, the invention features a method for preparing a lithium-ion battery including providing a cathode comprising a lithium compound and adding solid additives to the cathode. The solid additives comprise metal nitrides and/or borates.

In general, in another aspect, the invention features a solid buffer material to be used in the production of cathodes for Li-ion batteries comprising a metal nitride and/or a borate. The borates comprise one of boric acid, lithium borate, sodium metaborate, sodium tetraborate, sodium borate, ammonium borate, lithium metaborate, metaboric acid, borate salts, borate polysalts, lithium tetraborate, or mixtures thereof.

In general, in another aspect, the invention features a method for producing a solid buffer material to be used in the production of Li-ion batteries including providing a metal nitride in particulate form, adding the metal nitride to a borate to form a particulate mixture, and milling the particulate mixture. The metal nitride is added to the borate by homogenizing the metal nitride with borate dissolved in water to form a homogenized solution, and subsequently drying the homogenized solution to form the particulate mixture.

The details of one or more embodiments of the invention are set forth in the accompanying drawings and description below. Other features, objects and advantages of the invention will be apparent from the following description of the preferred embodiments, the drawings and from the claims.

BRIEF DESCRIPTION OF THE DRAWINGS

Referring to the figures, wherein like numerals represent like parts throughout the several views.

DETAILED DESCRIPTION OF THE INVENTION

Figure 1A:
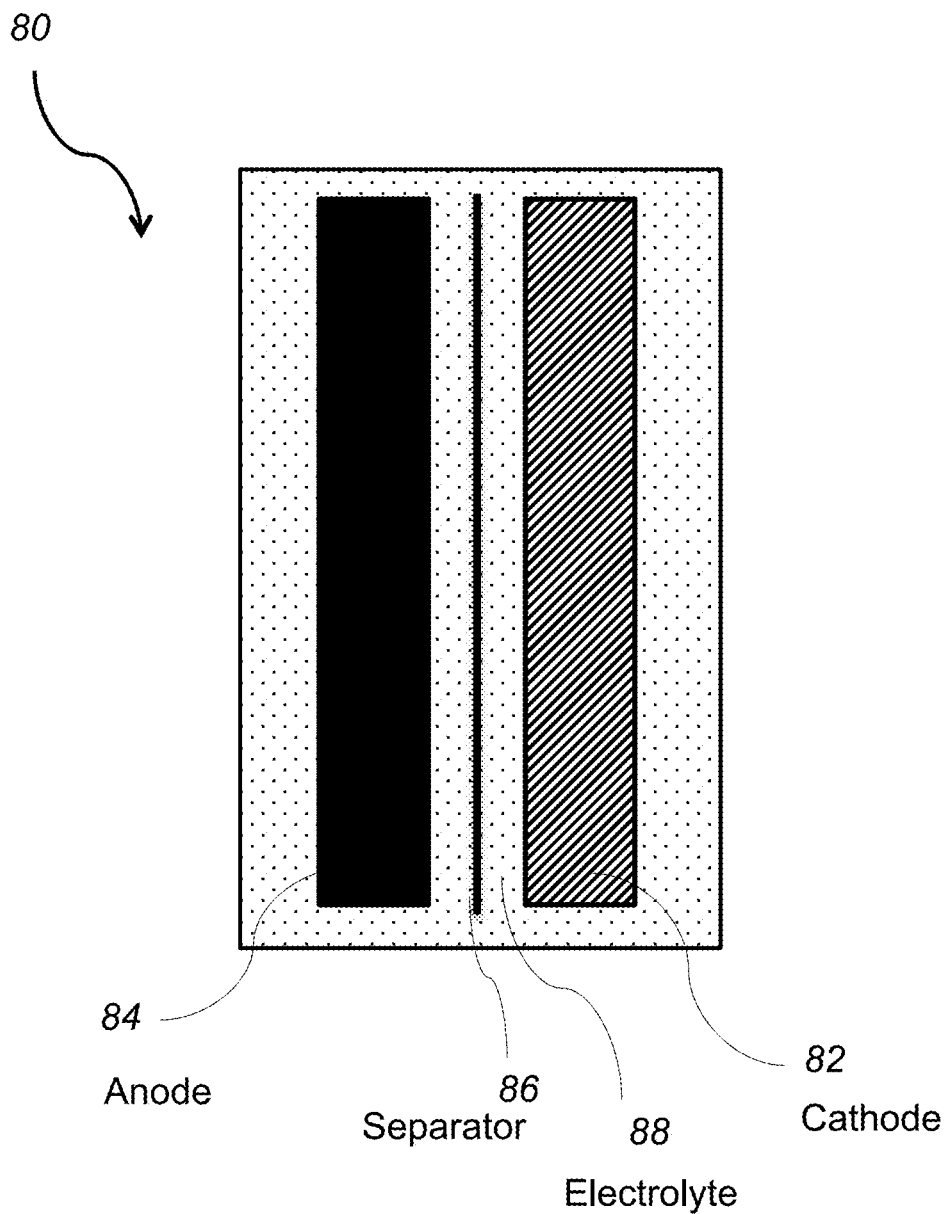
FIG. 1A is a schematic diagram of a prior art Li-ion battery.

The main approach to reduce cell inefficiency is to improve the stability of the chemicals that comprise the battery electrolyte to oxidation. Current trends replace the traditional hydrocarbon-based electrolytes such as those based on ethylene carbonate with solvents that are more difficult to oxidize. These newer solvents are typically fluorinated and can be expensive. The electrolyte performance can be further optimized by inclusion of soluble electrolyte additives. Many different soluble additives have been developed that help improve SEI formation, scavenge radicals that are created during cell operation, remove trace water and HF, or introduce redox shuttles that can mitigate damage from overcharge conditions.

Another approach to improve Li-ion longevity is to conformally coat the Li-ion cathode particles with an inorganic material prior to casting the cathode on the current collector. This inorganic shell is designed to limit exposure of the cathode particles to the electrolyte while still affording adequate Li-ion transport. This approach is typified by aluminum oxide based coatings. Other coatings have been explored such as zinc oxide and aluminum fluoride. The goal of these conformal coatings is to reduce the reactivity of the cathode particles to the electrolyte.

To achieve the longest lasting batteries, many different strategies may be employed at the same time. For example, fluorinated electrolyte solvents can be used with soluble additives packages that help promote stable cathode and anodes interfaces. The optimized electrolytes can be used in conjunction with cathodes where the individual cathode particles have been conformally coated with inert inorganic shells that reduce their reactivity prior to cathode fabrication.

Conformal coatings reduce reactivity of the cathode particles, but they do not address reactions that can occur on the high-surface area carbon blacks used to make the cathode films conductive. Carbon black can be electrochemically oxidized at high potentials to carbon monoxide and carbon dioxide. This reaction can consume water while producing HF. The acid produced can then attack the oxides comprising the cathode resulting in more water. In addition, it has been postulated that carbon black can intercalate hexafluorophosphate anions at high potentials which promotes a continuous discharge reaction when mixed with the high voltage cathodes. Therefore, conformal coatings can reduce the rate of oxidation of the electrolyte in contact with the cathode structure, but they do not eliminate all adverse reactions.

Soluble electrolyte additives have been developed that seek to manage water or acidic species. For example, amine-based organic bases such as butylamine have been investigated to react with acidic impurities. Carbodiimide-based compounds such as N,N'-dicyclohexylcarbodiimide have been used to capture water. Soluble bifunctional additives designed to react with both water and HF also exist such as N,N-diethylamino trimethyl-silane. However, it should be noted that it is difficult to design a high capacity acid scavenger based on organic chemistry due to the high molecular weight of the organic species.

Reactive inorganic conformal coatings have also been investigated. It has been suggested that HF produced at the cathode can be scavenged by coating the cathode materials, in particular $MnO_2$, with a lithium carbonate coating. The lithium carbonate scavenges acid by reacting with the HF to produce $CO_2$. However, the problem with this approach is that it also produces water. Water promotes the hydrolysis of the hexafluorophosphate anion common to Li-ion electrolytes resulting in the production of more acid. The acid then attacks the cell components producing more water resulting in a continual catalytic cycle. Formation of organic species not originally present in the electrolyte is detrimental to cell performance. Electrolyte oxidation can produce organic species such as alcohols, ketones, and organic acids that lower the electrochemical stability of the electrolyte resulting in further oxidation reactions. In particular, organic acids are known to be problematic to cell longevity. Complete oxidation of organic species generated eventually results in the production of carbon dioxide. The carbon dioxide gassing reaction damages the Li-ion battery structures and can also react at the anode resulting in high cell resistances.

The present invention improves the stability of Li-ion electrolytes by removing water, alcohol, organic acids, and HF produced from electrolyte oxidization. This approach helps maintain the Li-ion electrolyte over time and results in improved lifetime for the battery system.

The present invention describes solid additives that are added to the cathode improve in order to improve the Li-ion battery performance. These additives improve the capacity retention of Li-ion batteries extending their lifetime. The additives also reduce the growth in internal resistance of Li-ion batteries that is known to occur as Li-ion batteries age. The additives of this invention comprise substantial amounts of metal nitrides and/or borates. These metal nitride-based additives and borates help stabilize the Li-ion chemistry to high cell potentials or temperatures. Borates are compounds that include a borate anion. Examples of borates include boric acid (hydrogen borate), lithium borate, sodium metaborate, ammonium borate, lithium metaborate, metaboric acid, borate salts, borate polysalts, lithium tetraborate, or polymeric amines partially neutralized with boric acid, among others.

Figure 1B:
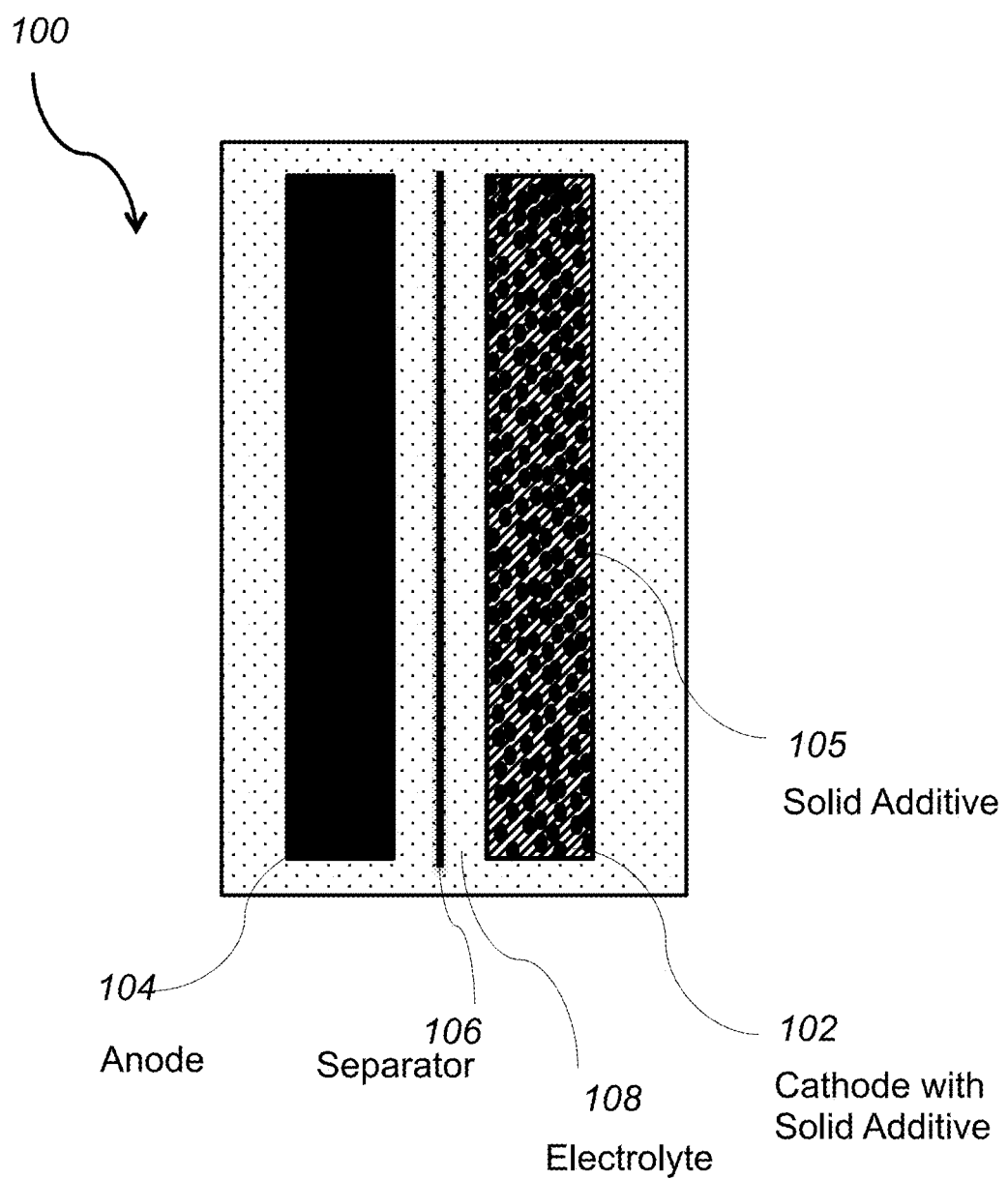
FIG. 1B is a schematic diagram of an improved Li-ion battery, according to this invention.

Referring to FIG. 1B, the metal nitrides and borates additives 105 are designed to be included in the cathode 102. In this embodiment, the additive materials 105 are not conformally coated on the cathode particles, but instead they are simply added in particulate form to the cathode ink prior to casting. Alternatively, the additive materials 105 are predispersed into carbon black or graphite and the composite carbon mixture then is added to the cathode ink. Similarly, manufacturers of cathode particles can admix the additive materials into their products to achieve improved performance of their products when sold to cell manufacturers.

Examples of metal nitrides include silicon nitride, aluminum nitride, titanium nitride, and boron nitride, among others. The additive materials of this invention are based on nitride materials, but can comprise many other components. For example, the activity of the additive system can be promoted through inclusion of other species including lithium compounds. As an example, boric acid and lithium borates strongly adsorbed on the nitride surfaces and provide for improved efficacy of the additive package. In addition, the various nitrides can be dispersed into various forms of carbon. The predispersion of the nitride-based additives into the carbon materials help ensure their uniform dispersion into the cathode ink.

Boron nitride is a characteristic example of the present invention. Boron nitride is readily available and has good safety characteristics. Commercially available grades include high surface area and fine particulate forms. Small particle sized metal nitride additives encourage good distribution in the cathode and help minimize the additive loading required to achieve beneficial performance.

The morphologies of boron nitride can be a result of the synthesis variables or they can be produced through milling, homogenization, and exfoliation. For example, boron nitride can be pre-exfoliated prior to adding it to the cathode ink. Boron nitride has been shown to exfoliate in n-methyl-2-pyrrolidone (NMP) when exposed to high shear mixing. Given most cathode ink formulations utilize NMP, exfoliation of boron nitride is expected to occur to some extent depending on the method of dispersion used during manufacture of the cathode inks.

Boron nitride is also a soft material that allows it to be easily blended into other materials. For example, the boron nitride additive can be milled into carbon black to encourage good dispersion. The composite of the carbon black and boron nitride-based additive is then added to the cathode ink. Alternatively, graphite can be used instead of carbon black. The mixture of boron nitride and graphite provides additional lubricity of the final cathode formulation to aid consolidation.

The metal nitride-based cathode additives and borates disclosed are believed to remove many different types of species that can be generated by the adverse reactions that occur in the cathode. The nitride-based additives and borates act as an absorbent material for organic acids and for transition metal cations that are released from the cathode oxides. Such additives also interrupt the full oxidation of the alcohols or organic acids that would otherwise result in the production of carbon dioxide. Finally, the disclosed metal carbide-based additives scavenge water or acid from the electrolyte. The removal of these various species in the cathode structure helps prevent the transfer of these compounds or cations to the anode where they can damage the solid electrolyte interface of the anode.

Metal nitride-based cathode additives and borates represent a new approach to managing electrolyte degradation reactions which is substantially different from traditional techniques that apply inorganic coatings directly onto the cathode particles. Conformal coatings seek to reduce the reactivity of cathode materials in order to decrease the rate of production of damaging chemical species that are produced at the cathode during cell operation. On the contrary, the present invention uses nitride-based additives and borates to mitigate the damage that these damaging chemical species (i.e., water or acid from the electrolyte) cause once created.

Another difference is that the inorganic coating used to reduce cathode reactivity must be substantially conformal and is applied to the cathode particles themselves. This requires complex processes and increases the manufacturing cost of the cathode powder. Given the cathode active material represents the significant majority of the cathode and the battery itself, price increases due to conformal coatings can significantly increase the cost of goods for cell manufacturers. The additives used in the present invention are simply included in the cathode ink in particulate form separate from the cathode particles and only small amounts are required in the cathode film to see substantial benefit. As such, these additives provide a new function to stabilize Li-ion electrolytes from oxidation damage that has not been previously available.

According to the present invention, the additive material is blended with carbon black, graphite, or other chemical promoters in a ball mill to create a fine particulate nitride-based additive. The additive is then added into the cathode ink prior casting. In one example, the loadings for the nitride-based cathode additives are 0.5-2 weight percent of the cathode total solids.

Example 1: Preparation of Boron Nitride Based Additive

A hexagonal boron nitride nanopowder was purchased from US Research Nanomaterials, Inc (#US2019). The average particle size was 70-80 nm and the reported surface area was 25-35 m$^2$/g. The material was produced through plasma spraying and our analysis of this boron nitride revealed that it contained oxygen impurities. In particular, SEM/EDX analysis was used to measure the atomic composition of this boron nitride powder. The EDX analyzer calculated a B:N:O atomic ratio of 44.7:39.6:15.7. 28 grams of boron nitride was loaded into a simple roller-style ball mill with 2 weight percent Timcal C65 carbon black and dry milled to promote good dispersion and fine particle size. The boron nitride was collected and used as a solid cathode additive for Li-ion batteries.

Example 2: Preparation of Boron Nitride Based Additive Promoted with Boric Acid

A fine particulate boron nitride was purchased from Momentive (AC6111). This powder has a surface area 40 m$^2$/g and small mean particle size of about 0.5 microns. This grade of boron nitride has fairly low oxygen content specified by the manufacturer as 2.0 weight percent. The soluble borates were specified as 0.3 wt %. 27 grams of the AC6111 boron nitride was homogenized with 7.3 grams of boric acid dissolved in water. The homogenizer used was a Polytron PT 2100 homogenizer with a 20 mm diameter probe. After drying at 150° C., the resulting agglomerates were then ball milled with 5 weight percent carbon black (Timcal C65) to promote good dispersion. The resulting powder was collected and used as a solid cathode additive for Li-ion batteries.

Example 3: Preparation of Aluminum Nitride Based Additive Promoted with Boric Acid Aluminum nitride was purchased from Alfa Aesar (#11546) with an average particle size specified as less than 4 microns. 20 grams of aluminum nitride was homogenized in water with 5.4 grams of boric acid. The pH of the solution was 4.3 after homogenization. The mixture was dried at 150° C. and milled to break up agglomerates. After processing, the aluminum nitride-based powder was mixed again with water and the pH of the slurry was 7.8. The resulting powder was collected and used as a solid cathode additive for Li-ion batteries.

Example 4: Coating of Prefabricated Cathodes

Several prefabricated cathodes were purchased and cut into electrodes for testing. Various metal nitride-based additives were dispersed in n-methyl-2-pyrrolidone (NMP) with a polyvinylidene fluoride (PVDF) binder. The ink contained 99 weight percent additives and 1 weight percent PVDF on a dry basis. An ethylene propylene diene monomer (EPDM) rubber roller was coated with the ink and then used to apply the ink on the prefabricated cathodes. The ink was dried and batteries were fabricated to test the effect of the metal nitride additives on cell performance.

Alternatively, the various metal nitride-based cathode additives were blotted onto an EPDM rubber foam. The foam was then used to apply the dry additive to the prefabricated cathodes and these coated cathodes were used to study the effect of the metal nitride additives on cell performance.

Example 5: Including Metal Nitride-Based Additives in Lithium Cobalt Oxide (LCO)-Based Cathode Inks Cathode inks were made using a Thinky ARE-500 planetary mixer. 9.57 grams of lithium cobalt oxide (LCO), 0.250 grams Timcal C65 carbon black, and 0.18 grams of PVDF were added to a Thinky mixing cup. 5.7 grams of NMP was added and the mixture was spun at 1000 RPM for a total of 10 minutes with 2 short pauses added to prevent excessive heating of the ink. The cathode inks were then cast on aluminum foil, dried, and cut into electrodes.

Inks containing the nitride-based additives and borates were made in the same manner by substituting the additive for portions of the cathode and carbon black used in the baseline ink formulation. In one example, 1.5 weight percent aluminum nitride ink is made by mixing 9.42 grams LCO, 0.15 grams aluminum nitride, 0.250 grams C65, and 0.18 grams PVDF with NMP in the Thinky Mixer. The 1.5 weight percent is given as a percentage of the total solids.

In another example, boron nitride was added at the 1 weight percent level. In this case, 9.47 grams of LCO were added with 0.1 grams boron nitride, 0.25 grams C65, and 0.18 grams PVDF.

In the present invention, the weight percent reported for a solid additive in the dried cathode film includes all non-carbon constituents. However, if the boron nitride is predispersed into carbon black, the various levels used to make the cathode ink change to maintain a consistent basis for comparing activity. For example, if boron nitride is predispersed with 40 weight percent carbon black, then 9.47 grams of LCO is mixed with 0.167 grams of the nitride-based additive, 0.183 grams C65, and 0.18 grams PVDF resulting in a net 1 weight percent additive level in the cathode film.

Example 6: Including Metal Nitride-Based Additives in NMC-Based Cathode Inks Cathode inks were made using a Thinky ARE-500 planetary mixer. 9.42 grams of NMC-532 cathode, 0.340 grams Timcal C65 carbon black, and 0.240 grams of PVDF were added to a Thinky mixing cup. 6.85 grams of NMP was added and the mixture was spun at 1000 RPM for a total of 10 minutes with 2 short pauses added to prevent excessive heating of the ink. The cathode inks were then cast on aluminum foil, dried, and cut into electrodes. The various additives developed were then substituted into the NMC inks as described in Example 5.

Example 7: Testing Additives in LCO-Based Batteries

The techniques described in example 5 were used to make several LCO cathode films that included 1 weight percent of the boron nitride-based additive described in example 1 in the cathode structure. The boron nitride-based additive was added to the ink in particulate form. Several LCO cathode films were also produced identically that did not contain any solid cathode additives.

The cast and dried cathodes were used to construct Li-ion test cells using graphite anodes. After degassing, the assembled batteries were filled with an electrolyte. The electrolyte used in this example was a 1M $LiPF_6$ in a mixture of ethylene carbonate, ethyl methyl carbonate, and fluoroethylene carbonate (EC/EMC/FEC 25/65/10) and included 1 wt % LIBOB and 0.5 wt % ethylene sulfate additives.

Figure 2:
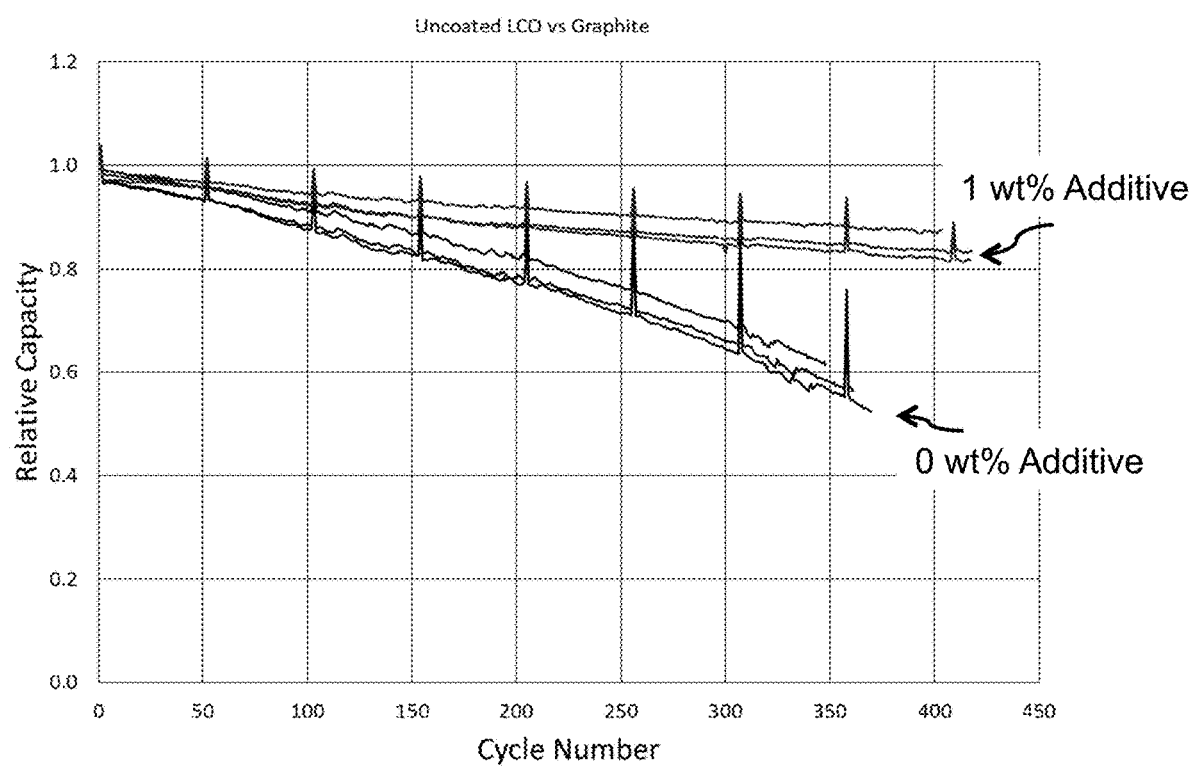
FIG. 2 is a graph of the relative capacity retention versus the cycle number for the Li-ion battery of the example 7.

After forming to 4.4V, the cells were cycled to understand the effect of the additive on capacity retention. The cycling program used charged the Li-ion batteries at 0.7C to 4.4V. The program then held the battery at 4.4V until the current dropped to a C/40 limit. The cells were then discharged at 0.5C to 3.5V and then charged again in a continuous loop. After every 50 cycles, a 0.2C discharge to 3V was used to measure the capacity of the Li-ion battery at a slower rate. The results of this program are shown in FIG. 2. The additives helped prevent capacity fade for the LCO battery at both the fast and slow discharge rates.

Figure 3:
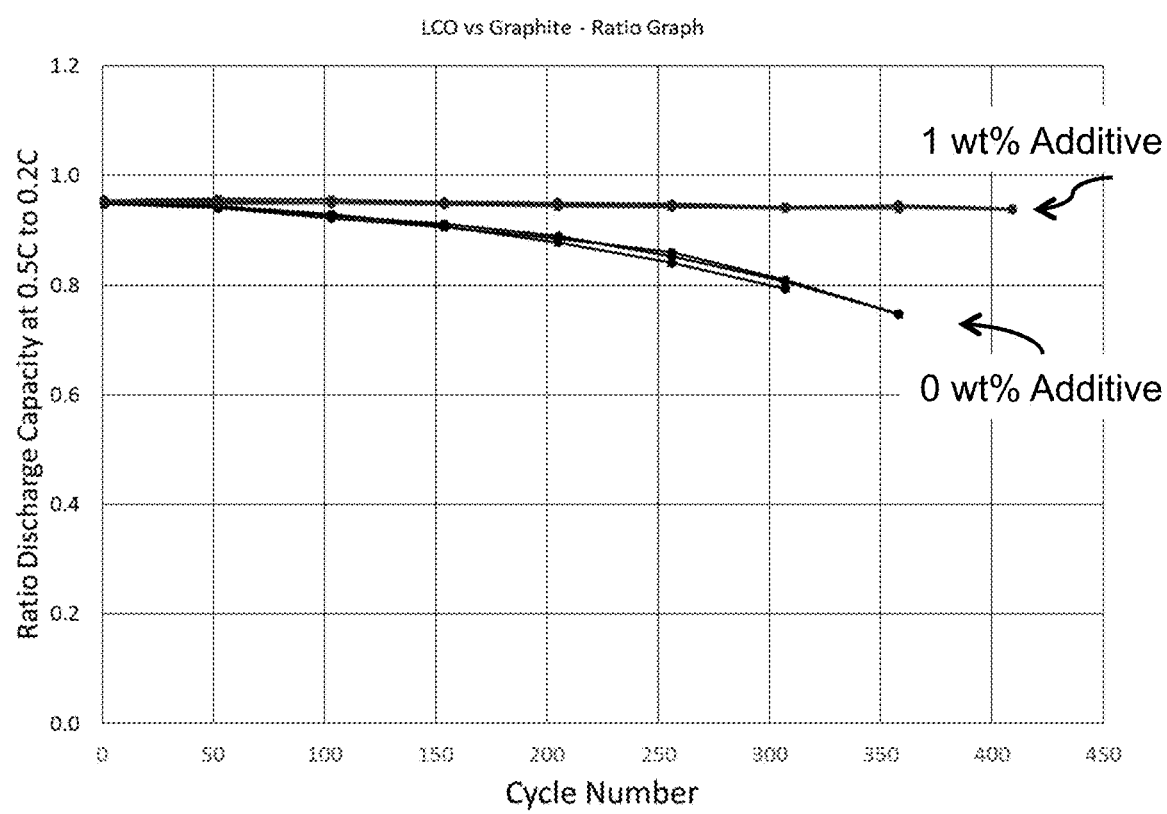
FIG. 3 is a graph of the ratio discharge capacity at 0.5C to 0.2C versus the cycle number for the Li-ion battery of the example 7.

The additives also helped maintain high rate performance. In FIG. 3, the discharge capacity achieved from the 0.5C discharge steps is compared to that obtained from the slower 0.2C discharge cycles. This is presented as a ratio of the discharge capacity obtained at 0.5C to that obtained at 0.2C in the vicinity of each individual slow cycle of the cycling program. For the LCO-battery that includes the boron nitride-based additive of example 1, the relative capacities obtained at the different rates remains essentially constant. For the LCO-battery that does not include the additive, the capacity obtained at the higher rate slips overtime relative to that obtained from slower cycles. In this case, the battery is losing its ability to deliver capacity at higher rates of discharge.

Example 8: Testing Additives in LCO-Based Batteries

In this example, the boron nitride-based additive that is promoted with boric acid as described in example 2 was used to produce several cathode films. The cathode additive was included at 1 weight percent of the total solids. Several identical cathode films were produced that did not include the cathode additive. LCO-based test cells were constructed using graphite anodes and after degassing were filled with electrolyte. In this example, the electrolyte used was 1M $LiPF_6$ in a mixture of ethylene carbonate, ethyl methyl carbonate, and diethyl carbonate (EC/EMC/DEC 3/5/2 v/v)

and included an additive package of 1% vinylene carbonate, 1% propane sultone, 2% fluoroethylene carbonate, and 1% succinonitrile.

Figure 4:
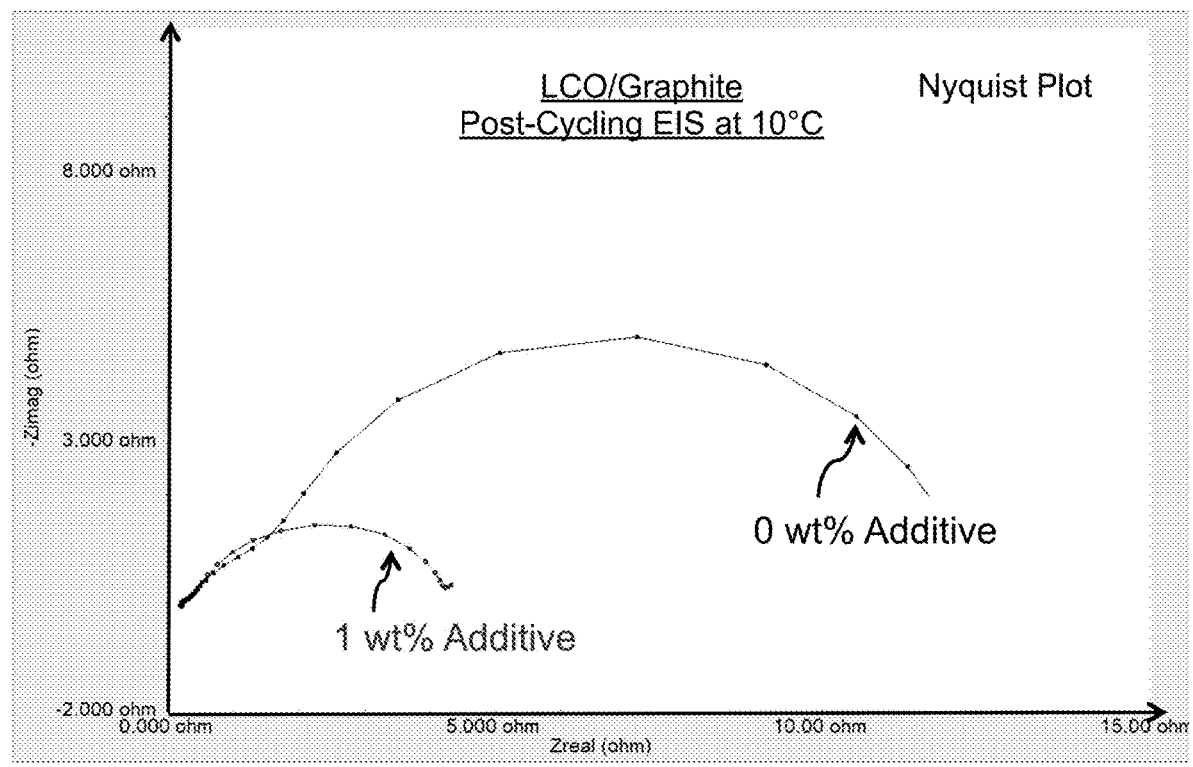
FIG. 4 depicts a Nyquist plot (internal resistance obtained after HPC cycling) for the Li-ion battery of the example 8.

In this example, a high precision coulometer (HPC) was used to cycle the cells. The program used a simple 0.2C charge discharge cycle from 3.0V to 4.4V. The cells were tested in a temperature-controlled chamber and held at 35° C. After cycling for 2 weeks, the cells removed from the heat chamber and transferred to a refrigerated chamber controlled at 10° C. The internal resistance of the cells was measured using electrochemical impedance spectroscopy (EIS). FIG. 4 shows that the additive of example 2 helps the Li-ion batteries maintain a significantly lower internal resistance after cycling for 2 weeks under these conditions.

Example 9: Testing Additives in NMC-Based Batteries

The techniques described in example 6 were used to make several NMC532 cathode films that included 1 weight percent of the boron nitride-based additive that is promoted with boric acid as described in example 2 in the cathode structure. The boron nitride-based additive was added to the ink in particulate form. Several NMC532 cathode films were also produced identically that did not contain the boron nitride-based additive.

The cast and dried cathodes were used to construct Li-ion test cells using graphite anodes. After degassing, the assembled batteries were filled with an electrolyte. The electrolyte used in this example was a 1M $LiPF_6$ in a mixture of ethylene carbonate, ethyl methyl carbonate, and diethyl carbonate (EC/EMC/DEC 3/5/2 v/v) and included 1% vinylene carbonate.

Figure 5:
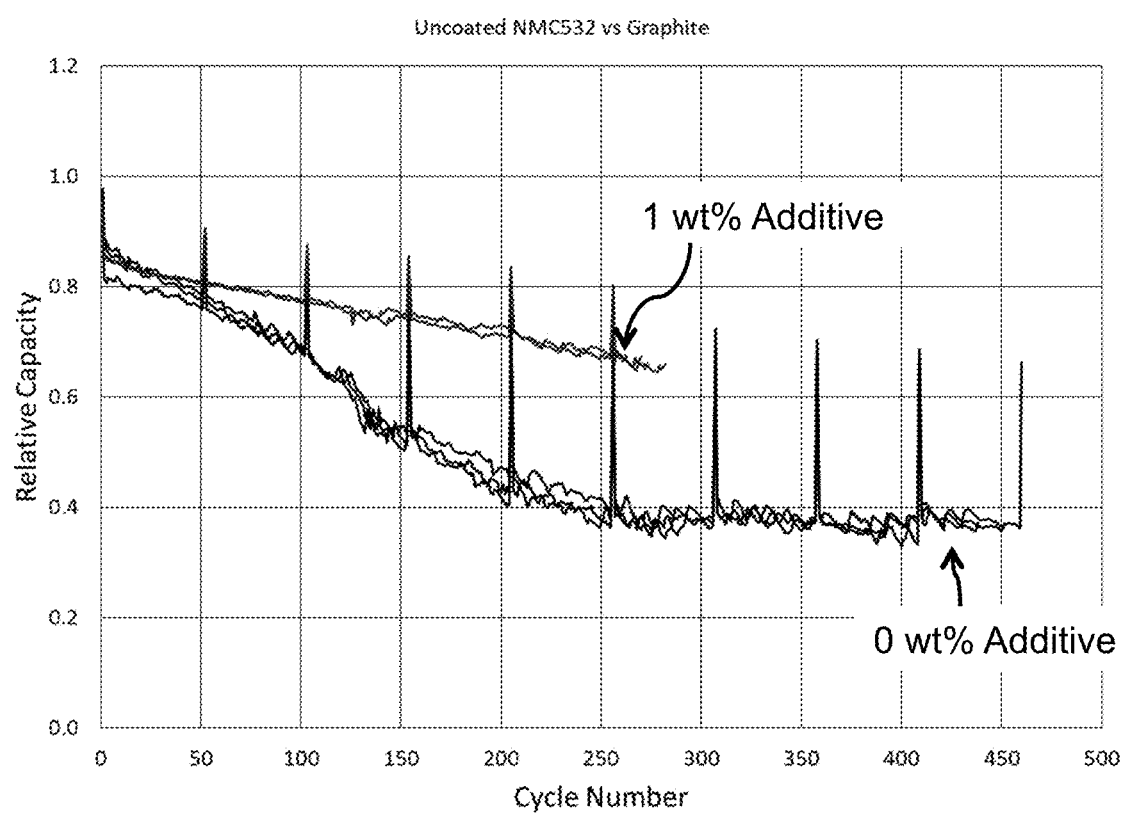
FIG. 5 is a graph of the relative capacity retention versus the cycle number for the Li-ion battery of the example 9.

After forming to 4.4V, the cells were cycled to understand the effect of the additive on capacity retention. The cycling program charges the batteries at 0.7C to 4.4V. The program then holds the battery at 4.4V until the current drops to a C/40 limit. The cells are then discharged at 1C to 3.2V and then charged again in a continuous loop. After every 50 cycles, a 0.2C discharge to 3V was used to measure the capacity of the Li-ion battery at a slower rate. The results of this program are shown in FIG. 5. The additive helped the capacity retention of the NMC battery for both the fast and slow discharge rates.

Figure 6:
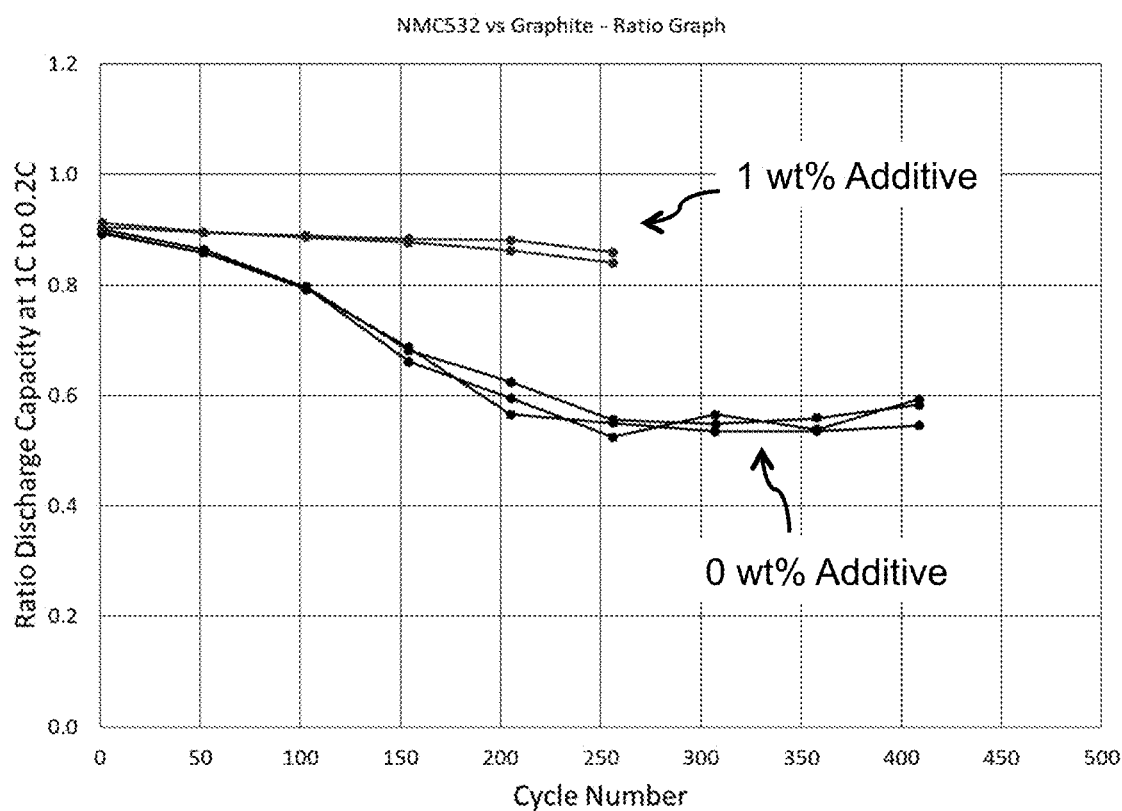
FIG. 6 is a graph of the ratio discharge capacity at 1C to 0.2C versus the cycle number for the Li-ion battery of the example 9.

The additive also helped maintain high rate performance. In FIG. 6, the discharge capacity achieved from the faster 1C discharge steps is compared to that obtained from the slower 0.2C discharge cycles. This is presented as a ratio of the discharge capacity obtained at 1C to that obtained at 0.2C in the vicinity of each individual slow cycle of the cycling program. For the NMC-battery that includes the boron nitride-based additive of example 2, the relative capacities obtained at the different rates remain essentially constant. For the NMC-battery that does not include the additive, the capacity obtained at the higher rate slips overtime relative to that obtained from slower cycles. In this case, the battery is losing its ability to deliver capacity at higher rates of discharge.

Example 10: Testing Additives in NMC-Based Batteries

In this example, the boron nitride-based additive that is promoted with boric acid as described in example 2 was used to produce several cathode films. The cathode additive was included at 1 weight percent of the total solids. Several identical cathode films were produced that did not include the cathode additive. NMC532-based test cells were constructed using graphite anodes and after degassing were filled with electrolyte. In this example, the electrolyte used was 1M $LiPF_6$ in a mixture of ethylene carbonate, ethyl methyl carbonate, and diethyl carbonate (EC/EMC/DEC 3/5/2 v/v) and included an additive package of 1% vinylene carbonate, 1% propane sultone, 2% fluoroethylene carbonate, and 1% succinonitrile.

In this example, a high precision coulometer (HPC) was used to cycle the cells. The program used a simple 0.2C charge discharge cycle from 3.0V to 4.4V. The cells were tested in a temperature-controlled chamber and held at 40° C. After cycling for 2 weeks, the cells were removed from the heat chamber and transferred to a refrigerated chamber controlled at 10° C. The internal resistance of the cells was measured using electrochemical impedance spectroscopy (EIS).

Figure 7:
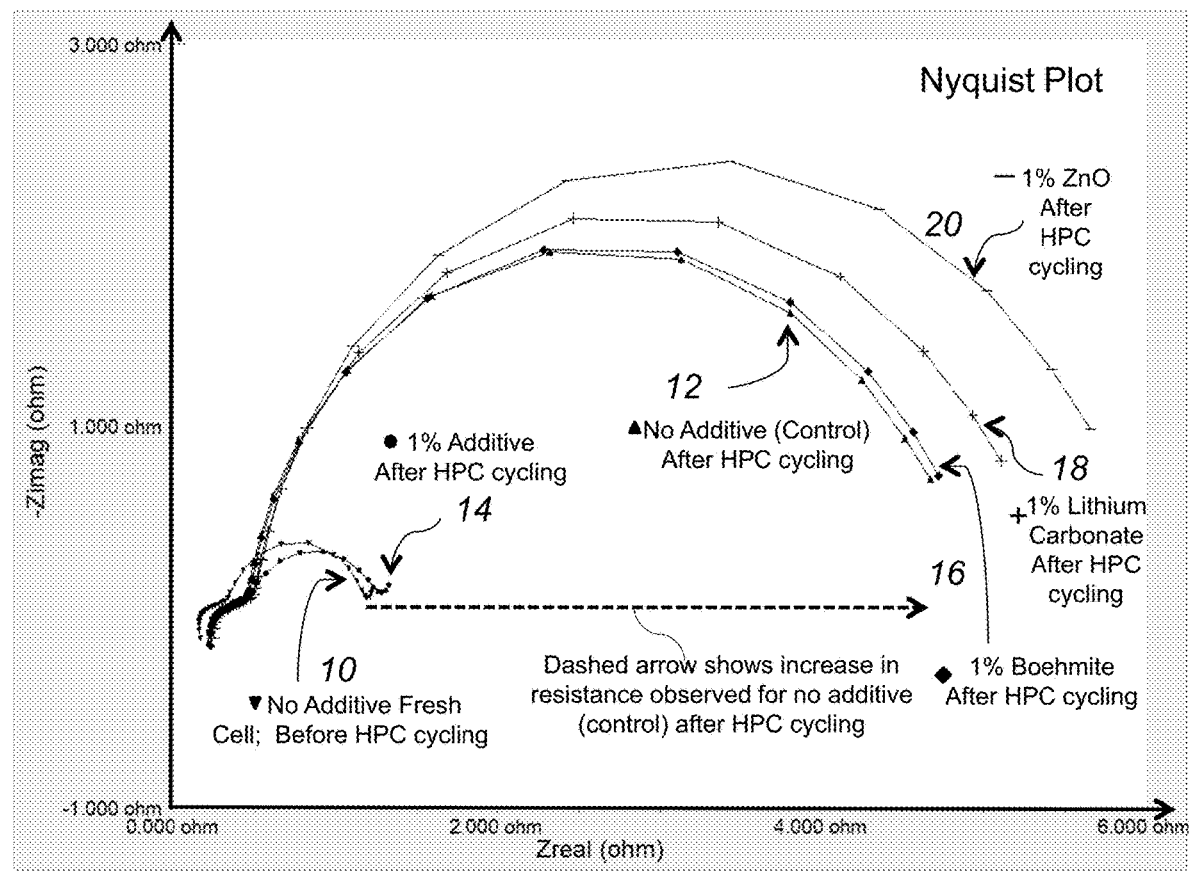
FIG. 7 depicts a Nyquist plot for the NMC532 battery of the example 10.

As shown in the Nyquist plot of FIG. 7, the additive of example 2 helps the Li-ion batteries maintain a significantly lower internal resistance after cycling for 2 weeks under these conditions (curve 14) than control (curve 12). FIG. 7 also depicts a Nyquist plot for a fresh battery cell without any additive before HPC cycling (curve 10) and after HPC cycling (curve 12). A dashed arrow included in FIG. 7 shows the increase in resistance observed between the fresh Li-ion battery that does not include the additive of example 2 before cycling at 40° C. to 4.4V and the Li-ion battery with no additive after two weeks of cycling. In comparison, the Li-ion battery made with the additive of example 2 shows minimal increase in total resistance under these conditions (curve 14).

FIG. 7 also includes Nyquist plots for several identical cathode films that included 1 weight percent of the total solids additives such as boehmite (curve 16), lithium carbonate (curve 18), and zinc oxide (curve 20). None of these materials demonstrate the same benefit of the additive technology of the present invention.

Example 11: Thermal Stability Testing

An ex-situ thermal stability test was developed that heats standard ethylene-carbonate based electrolytes in the presence of the various nitride materials for extended periods of times. The standard technique loads 50-55 mg of additive in a 7 ml glass scintillation vial along with 3.5 milliliters of electrolyte and a micro-stir bar. The samples are tightly sealed and heated in a dry mantle that includes an embedded thermocouple which controls the temperature. The samples are then stirred for several weeks while heating at 60° C. After the soaking period is over, the samples are removed from the heat, cooled, and filtered using a syringe filter.

Under this testing, the electrolyte vial that contained no additives would turn dark brown and develop significant pressure. Upon opening, the pressure would pop and bubbling ensued from the electrolyte for a significant period of time. Successful samples would not discolor or develop noticeable pressure.

Figure 8:
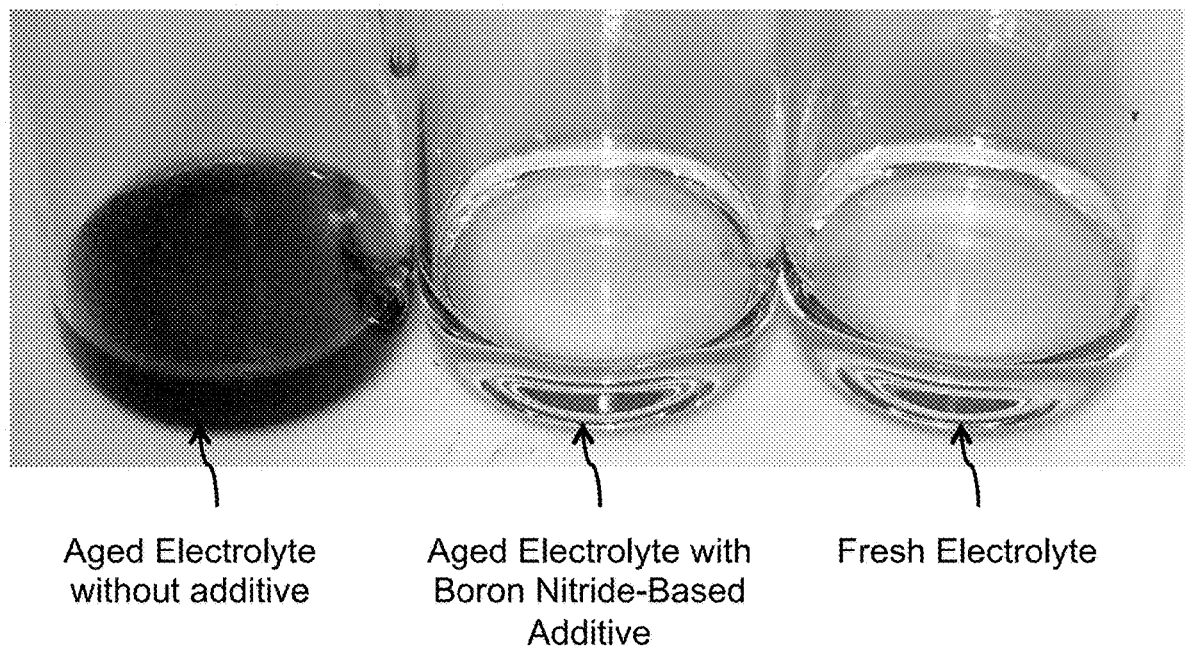
FIG. 8 depicts images showing thermal stability results of the aged electrolyte without an additive, aged electrolyte with a Boron Nitride-based additive according to example 1 of this invention, and a fresh electrolyte.

FIG. 8 shows the results of this test for the boron nitride-based additive described in example 1. In this example, the electrolyte used was a 1M $LiPF_6$ in a mixture of ethylene carbonate, ethyl methyl carbonate, and diethyl carbonate (EC/EMC/DEC 3/5/2 v/v) and included 1% vinylene carbonate. The additive was included at 55 mg in 3.5 milliliters and heated for 10 weeks at 60° C. On the left, the aged electrolyte without additive was dark brown. As noted, the pure electrolyte sample popped when the vial was opened and continued bubbling gases for some time. The contents were clearly pressurized. In the middle, the electrolyte heated in the presence of the boron-nitride additive described in example 1 is shown after filtering. This sample did not have noticeable pressure and was not brown. The sample was substantially identical in color to fresh electrolyte which is shown on the right.

This test was performed on several nitride materials many of which performed well. Silicon nitride (beta and amorphous), titanium nitride, zirconium nitride, aluminum nitride, and calcium nitride all helped prevent discoloration. Boron nitride grades that contained minimal oxygen impurities also worked well and their performance in this test was improved by milling. For comparison, performing the same test on carbon black (Timcal C65) or graphite (CNERGY KS6L) resulted in a failed test. In these cases, the electrolyte turned dark brown and developed pressure similar to the electrolyte heated in the absence of solid additives.

Example 12: Reduction to Gassing

In commercial applications, high nickel cathodes are known to exhibit elevated gassing in cell operation. The cathode additives of the present invention reduce this gas generation. An ex-situ gassing experiment was performed to demonstrate the benefit of the various additives described in this invention.

Cathode inks were made using a Thinky ARE-500 planetary mixer. 9.42 grams of NMC-811 cathode, 0.340 grams Timcal C65 carbon black, and 0.240 grams of PVDF were added to a Thinky mixing cup. 6.85 grams of NMP was added and the mixture was spun at 1000 RPM for a total of 10 minutes with 2 short pauses added to prevent excessive heating of the ink. The cathode inks were then cast on aluminum foil, dried, and cut into electrodes. Inks containing the additives at 1 weight percent on a dry basis were made by substituting 100 mg of additive for 100 mg of cathode powder.

The cast and dried cathodes were used to construct Li-ion test cells using graphite anodes. After degassing, the assembled batteries were filled with an electrolyte. The electrolyte used in this example was a 1M LiPF$_6$ in a mixture of ethylene carbonate, ethyl methyl carbonate, and diethyl carbonate (EC/EMC/DEC 3/5/2 v/v) and included 1% vinylene carbonate.

The Li-ion batteries were then formed by charging the battery at C/10 to 4.2V and then discharged to 3.0V. The cells were then charged at C/10 to 4.3V and held at 4.3V for 2 hours. After this forming process, the cells were carefully opened and the cathodes were removed from the Li-ion battery without shorting and inserted into a new Li-ion pouch, filled with the same electrolyte, and sealed under vacuum. The resulting pouch cell therefore comprised only of fully charged NMC 811 cathode with fresh electrolyte.

Figure 9:
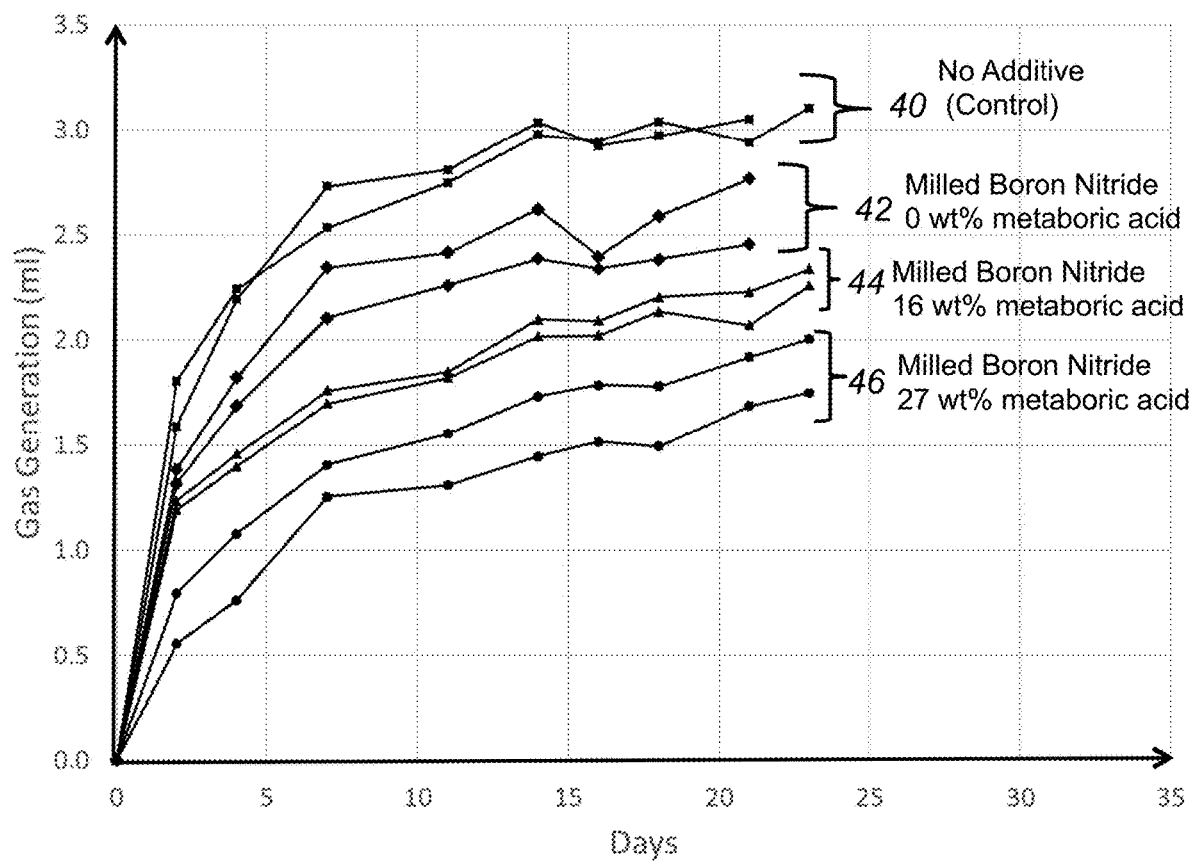
FIG. 9 depicts plots of measured gas generation as a function of time for the charged cathode films of example 12.

The charged cathode pouches were then introduced to a heated oven at 60° C. The cathodes were monitored using the method of Archimedes for gas generation. FIG. 9 depicts plots of the measured gas generation as a function of time. Curves 40 depict the gas generation from cathodes without any additive. Curves 42, 44, 46 depict gas generation from cathodes with additives. As shown in FIG. 9, a strong reduction in gas generation is observed due to the presence of the additives according to this invention.

In this example, all additives were based on the commercially available HCV grade of boron nitride produced by Momentive Performance Materials. This material has a surface area of 40 m$^2$/g and mean particle size of 7-11 microns. The HCV material was not used as obtained, but was instead milled for 48 hours with various amounts of metaboric acid. Metaboric acid was produced by dehydrating boric acid in air at 130° C. for 2 hours. The levels of metaboric acid used in FIG. 9 were HCV boron nitride as milled (0 weight percent) (curves 42), HCV boron nitride milled with 16 weight percent (curves 44), and HCV boron nitride milled with 27 weight percent (curves 46). The study showed that the additives of the present invention reduce gas generation from the cathodes and that higher levels of metaboric acid in the additive correlate with a reduction in gas generation rate.

Example 13: Buffering Ability of the Nitride-Based Additives

Figure 10:
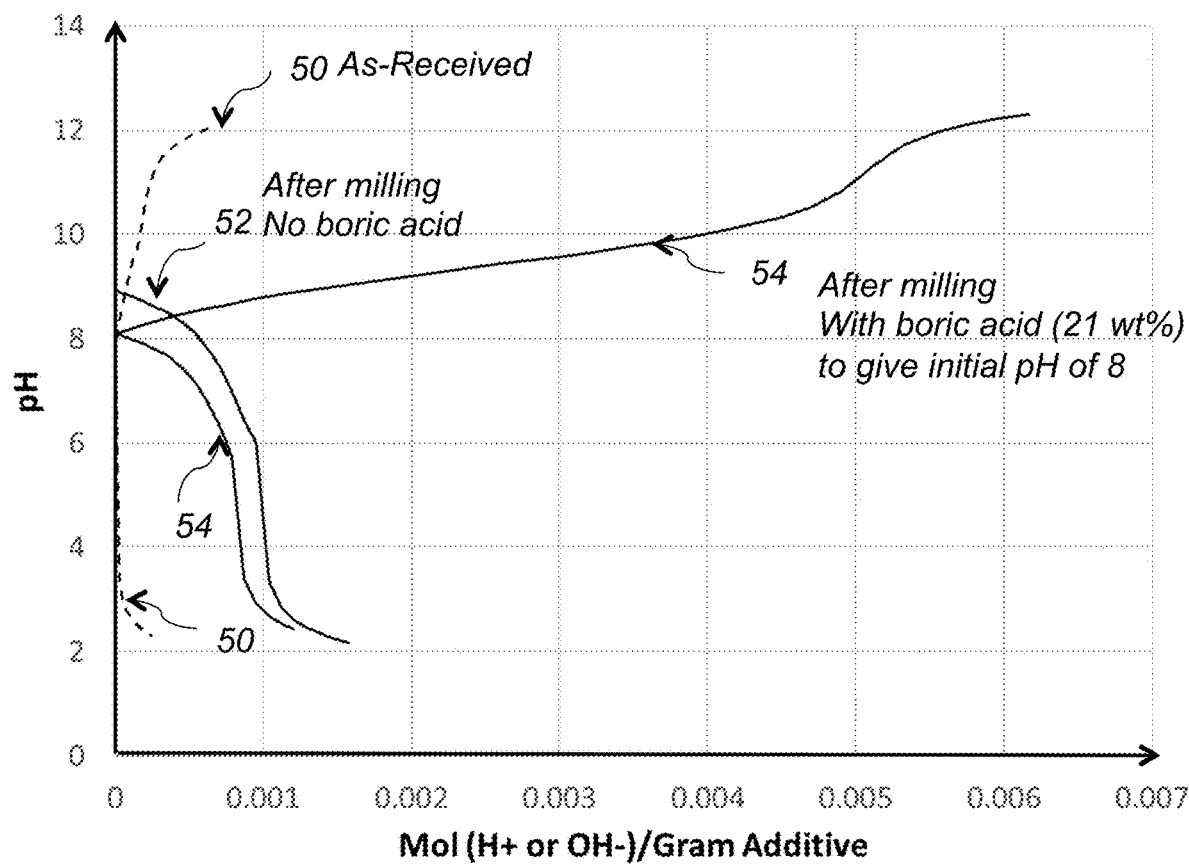
FIG. 10 depicts titration curves for the additives described in example 13.

HCV boron nitride was obtained from Momentive Performance Materials. The HCV boron nitride was then titrated with dilute sulfuric acid and dilute potassium hydroxide. FIG. 10 shows the titration curves (plots of the pH of the solution versus the volume of the titrant) for the as-received HCV boron nitride material in dashed lines (curves 50). The titration slurry used 1.42 grams of additive to 60 ml of water.

We discovered that milling the nitride materials changes the reactivity of the nitride materials. As an example, the HCV grade of boron nitride was milled using zirconium oxide media in a US stoneware pebble mill for 48 hours. The milling process produces a defective boron nitride material that has elevated basic sites that can be observed by titrating with dilute sulfuric acid (curve 52).

FIG. 10 also shows an example of a formulated additive as described in prior examples. In this case, boric acid was added to HCV boron nitride at a 21 wt % basis. The physical mixture was then milled for 48 hours to produce an additive that had sites to react with both basic and acidic species. In this example, the pH of the composite was formulated such that the additive provided a pH of 8.0 in deionized water (curves 54). After milling, the additive described can also be heated to 230° C. in air to produce the substantially same pH response.

The nitride-based additives of this invention represent a new class of solid buffer technology. In particular, the nitride materials act as a Lewis base and the boric acid is a known Lewis acid. The additives described provide both acidic and basic sites to react with electrolyte impurities that are generated during cell operation. The energy levels of the acid or basic sites of the solid additives can be altered by changing the type of nitride or borate used in the formulation. The relative capacity of the acid and base sites can be selected by formulation of the additive and the mechanical energy input used to create defective nitride materials. In application to Li-ion batteries, the additives can be thermally dehydrated during manufacture. Alternatively, the additives can be dehydrated in the same process used to dry the cathode films. In one example, no borates are added to the nitride-based additive. In another example, the additive is a mixture of boric acid and boron nitride with a weight ratio of 35:65. In other examples, boric acid is mixed with metal nitrides in the range of 0 to 80 wt % of the total mass of the nitride-based additive.

In example 11, the nitride materials are responsible for preventing the discoloration of the electrolyte due to high temperatures. In particular, boric acid, metaboric acid, and boric oxide all accelerate the decomposition of the electrolyte in this test. In example 12, the borate component is responsible for the reduction in the gas generation rate of the high-nickel cathode.

The additives of the present invention are comprised of a mixture of acidic and basic species in a ratio used to optimize the benefits observed for a particular Li-ion chemistry and electrolyte to the operating conditions desired. In general, sufficient nitride material should be included so that a slurry (0.025 g/ml) of the solid additive has a starting pH above 6.0, preferably above 7.0 so that boric acid does not accelerate the decomposition of the electrolyte. The acidity of the boric acid can also be reduced by using a blend of alkaline borate salts such as lithium borate, sodium borate, or ammonium borate. The pH of the solution should be less than 10, preferably less than 9, so that likelihood of releasing ammonia into the electrolyte is reduced. For traditional battery cathodes and electrolytes, the preferred range of pH for the additives as measured in water is in the range of pH 7 to pH 9. In one example the additives are selected so that the starting pH of the solution is in the range of 7.3 to 8. In another example, the amount of boric acid included in the additive is maximized while maintaining the additive to be non-acidic to water.

Example 14: Selection of Boron Nitride Grade

As described in example 1, boron nitride materials often contain oxygen impurities. Therefore, depending on the grade of boron nitride used to formulate the additive, it may not be needed to add borates. In this case, the boron nitride materials can be used as-received, though the performance is typically enhanced through physical milling to create higher surface area and more defective nitride materials.

Figure 11:
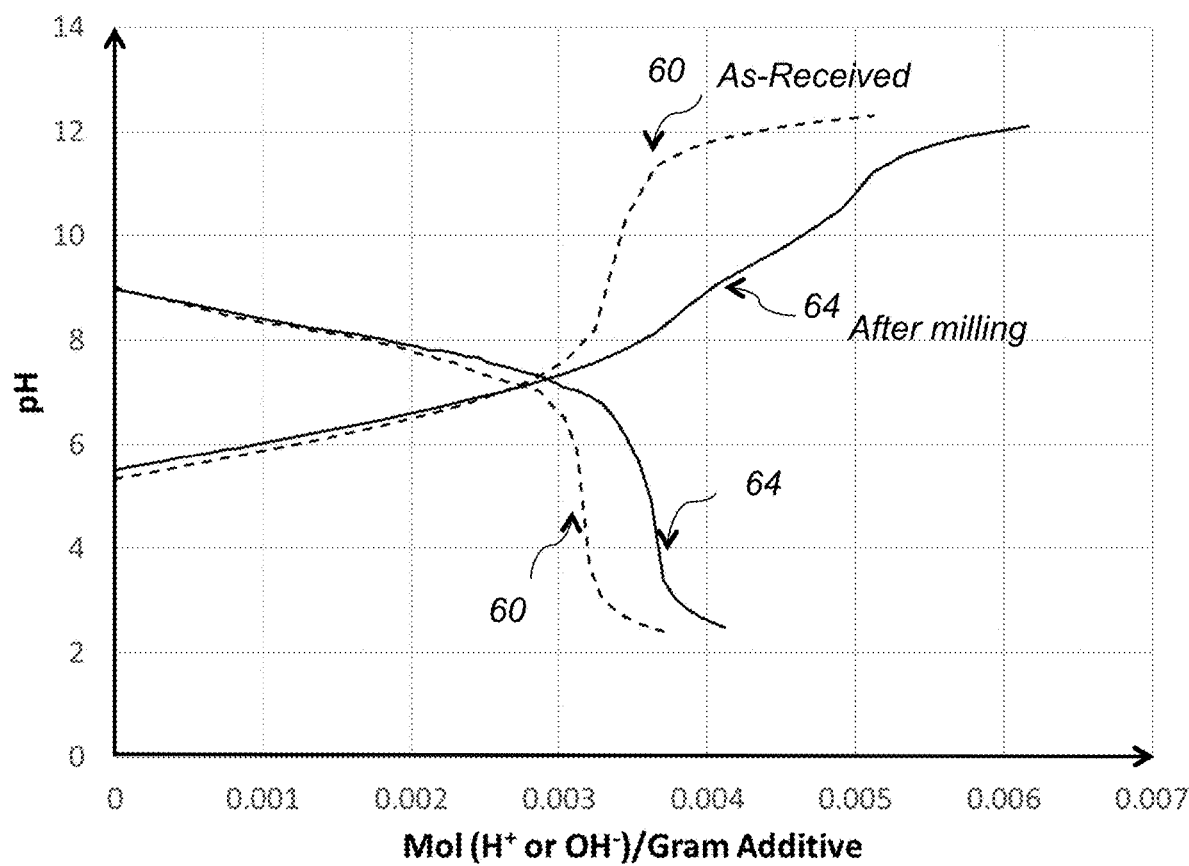
FIG. 11 depicts titration curves for the additives described in example 14.

As an example, Momentive Performance Materials also offers a well-characterized grade of boron nitride called NX9. This material has a 9 micron particle size and an oxygen content of 11-13 wt %. The soluble borates are given as 4.0-7.0 wt %. This material was titrated in the same manner as example 13 using sulfuric acid and potassium hydroxide and the titration results are shown in FIG. 11. It should be noted that in this example, the KOH titration was performed with the NX9 dispersed into a solution of mannitol in water (54.6 g/L). Mannitol is used in analytical chemistry to improve the equivalence point determination when titrating boric acid with bases. The starting pH of the NX9 materials should therefore be observed from the acid titration curve.

Momentive's NX9 grade of boron nitride has capacity to both acid and bases as received. Therefore, it should be noted that when this disclosure refers to boron nitride materials, it includes grades of pure boron nitride and boron nitrides that inherently have non-trivial quantities of oxygen impurities.

Example 15: Borate Buffer/Additive 1.518 grams of lithium metaborate (Alfa Aesar #A16145) was dissolved in 100 ml of water resulting in a solution with a pH of 9.5. The lithium metaborate was then titrated with a boric acid solution until the solution pH was 7.4. The solution was then vacuum dried and the powder ground and used as a cathode additive. The mass ratio of boric acid to lithium metaborate in this additive was 4.3:1. The additive was tested for performance using the methods described in example 9, 10, and 11. The additive helped the capacity retention of the NMC532 Li-ion battery compared to control, but was not as effective as the additives described in example 1 and example 2. The additive of example 15 also helped retain a lower total charge transfer resistance compared to control after high precision coulometry testing, though again not as well as the additives described in example 1 and example 2. The lithium metaborate/boric acid mixture additive failed the thermal aging test of example 11.

Example 16: Ammonium Borate Buffer/Additive

Ammonium Pentaborate octahydrate was obtained from Alfa Aesar (#12294). The pH of this salt was measured to be 8.0 at a concentration of 0.025 g/ml water. The as-received material was dried under vacuum overnight at 150° C. The vacuum pump used in this example was a single stage diaphragm pump (Vacuubrand ME2C) with an ultimate vacuum pressure of 80 mbar. The powder was ground and used as a cathode additive. The additive was tested for performance using the methods described in example 9, 10, 11, and 12. The additive helped the capacity retention of the NMC532 Li-ion battery compared to control, but was not as effective as the additives described in example 1 and example 2. The additive of example 16 also helped retain a lower total charge transfer resistance compared to control after high precision coulometry testing, though again not as well as the additives described in example 1 and example 2. The additive failed the thermal aging test of example 11. The additive of example 16 was effective to reduce the gas generation rate as compared to control under the test conditions described in example 12.

Example 17: Polyethyleneimine Borate Buffer/Additive

Polyethyleneimine (PEI) is a polymeric amine. 0.5 grams of PEI (Sigma #40528) was dissolved in 60 ml of water resulting in a solution with a pH of 11.1. The PEI was then titrated with a boric acid solution until the solution pH was 7.4. The solution was then vacuum dried and the powder ground and used as a cathode additive. The mass ratio of boric acid to PEI in this additive was 5.2:1. The additive was tested for performance using the methods described in example 9, 10, 11, and 12. In general, this additive performed well. The additive helped the capacity retention of the NMC532 Li-ion battery compared to control, but was not as effective as the additives described in example 1 and example 2. The additive also helped retain a lower total charge transfer resistance compared to control after high precision coulometry testing. The partially neutralized PEI powder based additive failed the thermal aging test of example 11. The additive of example 17 was effective to reduce the gas generation rate as compared to control under the test conditions described in example 12.

Other embodiments include one or more of the following. The metal nitride additives and the borate additives may be separately milled and then mixed with the cathode inks. Examples of borate additives include boric acid (hydrogen borate), lithium borate, sodium metaborate, ammonium borate, lithium metaborate, metaboric acid, borate salt, borate polysalts, lithium tetraborate, or mixtures thereof, among others.

Several embodiments of the present invention have been described. Nevertheless, it will be understood that various modifications may be made without departing from the spirit and scope of the invention. Accordingly, other embodiments are within the scope of the following claims.

What is claimed is:
1. A lithium-ion battery comprising:
   a cathode electrode comprising a lithium cathode compound, wherein the lithium compound comprises one of lithium cobalt oxides (LCO), or lithium nickel manganese cobalt oxides (NMC);
an anode electrode;
an electrolyte;
wherein the cathode electrode further comprises solid additives in particulate form and the solid additives comprise boron nitride and boric acid; and
wherein all the solid additives are uniformly dispersed within the cathode electrode.

2. The battery of claim 1, wherein the boron nitride comprises exfoliated boron nitride or milled boron nitride.

3. A lithium-ion battery comprising:
a cathode electrode comprising a lithium cathode compound, wherein the lithium compound comprises one of lithium cobalt oxides (LCO), lithium nickel manganese cobalt oxides (NMC), lithium nickel cobalt aluminum oxides (NCA), lithium iron phosphates (LFP) or lithium manganese oxides (LMO);
wherein the cathode electrode further comprises solid additives in particulate form and the solid additives comprise boron nitride and a borate; and
wherein all the solid additives are uniformly dispersed within the cathode electrode.

4. The battery of claim 3, wherein the borate comprises one of ammonium borate, metaboric acid, borate polysalts, or mixtures thereof.

5. The battery of claim 3, wherein the solid additives comprise a composite carbon mixture.

6. The battery of claim 3, wherein the solid additives comprise milled powders or exfoliated powders.

7. The battery of claim 3, wherein the solid additives comprise 0.5 to 2.0 weight percent of the cathode electrode total solids.

8. The battery of claim 1, wherein the solid additives comprise boron nitride homogenized in an aqueous solution of the boric acid.

9. The battery of claim 3, wherein an aqueous solution of the solid additives comprises a pH in the range of 6 to 10.

10. A method for preparing a lithium-ion battery comprising:
providing a cathode electrode comprising a lithium cathode compound, wherein the lithium compound comprises one of lithium cobalt oxides (LCO), or lithium nickel manganese cobalt oxides (NMC);
adding solid additives in particulate form to the cathode electrode wherein the solid additives comprise boron nitride and boric acid; and
wherein all the solid additives are uniformly dispersed within the cathode electrode.

11. The method of claim 10, wherein the boron nitride comprises exfoliated boron nitride or milled boron nitride.

12. A method for preparing a lithium-ion battery comprising:
providing a cathode electrode comprising a lithium cathode compound, wherein the lithium compound comprises one of lithium cobalt oxides (LCO), lithium nickel manganese cobalt oxides (NMC), lithium nickel cobalt aluminum oxides (NCA), lithium iron phosphates (LFP) or lithium manganese oxides (LMO);
adding solid additives in particulate form to the cathode electrode, wherein the solid additives comprise boron nitride and a borate, and wherein all the solid additives are uniformly dispersed within the cathode electrode.

13. The method of claim 12, wherein the borate comprises one of ammonium borate, metaboric acid, borate polysalts, or mixtures thereof.

14. The method of claim 12, wherein the solid additives are predispersed into carbon and form a composite carbon mixture and the composite carbon mixture is added to a cathode ink comprising the lithium cathode compound of the cathode electrode.

15. The method of claim 12, wherein the solid additives comprise milled powders or exfoliated powders.

16. The method of claim 12, wherein the solid additives comprise 0.5 to 2.0 weight percent of the cathode electrode total solids.

17. The method of claim 12, wherein the solid additives comprise boron nitride homogenized in an aqueous solution of the borate.

18. The method of claim 12, wherein an aqueous solution of the solid additives comprises a pH in the range of 6 to 10.

19. A method for producing a cathode to be used in the production of Li-ion batteries comprising:
providing boron nitride in particulate form;
adding the boron nitride to boric acid to form a particulate mixture;
milling the particulate mixture; and
adding the particulate mixture to a cathode electrode comprising a lithium cathode compound, wherein the lithium compound comprises one of lithium cobalt oxides (LCO), lithium nickel manganese cobalt oxides (NMC), lithium nickel cobalt aluminum oxides (NCA), lithium iron phosphates (LFP) or lithium manganese oxides (LMO); and
wherein the particulate material is uniformly dispersed within a cathode electrode.

20. The method of claim 19, wherein the boron nitride is added to the boric acid by homogenizing the boron nitride with boric acid dissolved in water to form a homogenized solution, and subsequently drying the homogenized solution to form the particulate mixture.

* * * * *